United States Patent [19]

Carlson

[11] 3,850,190
[45] Nov. 26, 1974

[54] BACKFLOW PREVENTER
[75] Inventor: Donald E. Carlson, Highland Park, Ill.
[73] Assignee: Mark Controls Corporation, Evanston, Ill.
[22] Filed: Sept. 17, 1973
[21] Appl. No.: 397,828

[52] U.S. Cl............................. 137/218, 137/525
[51] Int. Cl............................................. F16k 45/00
[58] Field of Search.............. 137/218, 216.2, 512.4, 137/512.15, 515.7, 515.5, 525.1, 511, 525.3, 525.1, 217, 798; 251/284

[56] References Cited
UNITED STATES PATENTS
| | | | |
|---|---|---|---|
| 3,308,798 | 3/1967 | Snider | 137/525.1 X |
| 3,543,786 | 12/1970 | Woodford | 137/218 |
| 3,670,760 | 6/1972 | Butcher | 137/218 |
| R26,235 | 7/1967 | Woodford | 137/218 |

Primary Examiner—William R. Cline
Assistant Examiner—Robert J. Miller
Attorney, Agent, or Firm—Mason, Kolehmainen, Rathburn & Wyss

[57] ABSTRACT

A backflow preventer in a fluid conduit permits flow from the inlet to the outlet when the inlet is pressurized, and prevents flow in the reverse direction while venting the outlet if the outlet pressure exceeds the inlet pressure. An apertured diaphragm between the inlet and outlet closes a valve seat between the outlet and a vent passage when the inlet is relatively pressurized. A check member upstream of the diaphragm closes the diaphragm aperture if the outlet is relatively pressurized, and maintains the diaphragm aperture closed upon pressurization of the inlet until after closing of the vent valve seat.

10 Claims, 7 Drawing Figures

BACKFLOW PREVENTER

The present invention relates to a backflow preventer.

Valves of the type generally known as backflow preventers, vacuum breakers, or antisiphon valves are used in fluid conduits for permitting flow in one direction from an inlet to an outlet when the inlet is pressurized and for preventing flow in the opposite direction should the outlet pressure exceed the inlet pressure. In addition, such valves commonly include a drain or vent passage communicated with the outlet passage when the inlet is not pressurized for draining or venting the outlet passage.

One example of the many uses of backflow preventers is in a water supply system wherein a backflow preventer may be connected to the outlet of a sill cock, wall hydrant, yard hydrant or the like. In such an arrangement, the outlet of the backflow preventer might typically be coupled to a hose or other conduit, and when the inlet of the device is pressurized as by opening of a water supply valve, flow from the inlet through the backflow preventer and hose is permitted. When the water supply valve is closed, or when the outlet pressure exceeds the inlet pressure, for example, by elevation of the hose, the backflow preventer operates to prevent reverse flow from the outlet to the inlet. In addition, in this condition a vent passage is intercommunicated with the outlet of the backflow preventer to permit the entry of air into the outlet so that the hose may drain if the hose is below the outlet, and alternatively to permit fluid from the hose to drain through the vent passages if the hose is elevated above the outlet.

Known backflow preventers take many forms. One typical arrangement includes a flexible diaphragm movable from an upstream position against a fixed valving plate to a downstream position against a fixed valve seat. When the inlet is pressurized, the diaphragm member moves from the valving plate and opens a flow path through the fixed valve plate to the outlet, while sealing the vent ports by engagement with the valve seat. One example of this type of backflow preventer may be found in U.S. Pat. No. 2,875,776 — Skipwith, Jr.

A disadvantage of this known type of backflow preventer is that in intermediate positions of the diaphragm, the inlet passage, the outlet passage and the vent passage are all in communication with one another. Backflow preventers having an additional movable valve member have been provided in order to prevent opening of communication to the outlet until after closing of the vent passages. Known backflow preventers of this type include a valve member located on the downstream side of the diaphragm biased by a spring into sealing engagement with a central opening in the diaphragm until after movement of the diaphragm in the downstream direction of sufficient extent to close the vent passages. An example of a backflow preventer of this character may be found in U.S. Pat. No. 3,171,423 — Dillon. Difficulties encountered with devices of this type include complexity and undesirable restriction to flow.

Yet another approach to the problem appears in British Pat. No. 875,034 of Regie Nationale Des Usines Renault. In this patent there is disclosed a backflow preventer having a complex, two-part piston arrangement including a flexible sleeve with a diaphragm portion. In this arrangement, upon pressurization of the inlet, the piston moves downstream and the outer periphery of the flexible portion seals the vent passages while the inner part of the diaphragm portion opens to intercommunicate the inlet and the outlet.

An important object of the present invention is to provide a novel backflow preventer characterized by simplicity in structure and by minimal disturbance of and restriction to flow through the preventer. Other objects are to provide a back-flow preventer which is reliable and long lasting in operation, economical to manufacture and assemble, and having relatively few and simple parts.

In brief, the above and other objects and advantages of the present invention are achieved through the provision of a backflow preventer including a housing with an inlet passage and an outlet passage. A generally annular diaphragm includes an outer edge clamped in the housing between the inlet and the outlet, and includes a central flow opening surrounded by an inner edge of the diaphragm. The diaphragm is of a flexible and resilient material so that it is capable of downstream movement in response to pressurization of the inlet. A valve seat surrounds the outlet passage and is disposed radially between the inner and outer edges of the diaphragm. The valve seat is spaced downstream from the diaphragm in its relaxed position, and upon downstream movement of the diaphragm, the diaphragm seals against the valve seat. A series of vent passages are provided in the housing radially outside of the valve seat to communicate across the valve seat with the outlet passage when the diaphragm is in its relaxed position.

In accordance with an important feature of the invention, a check member is provided on the upstream side of the diaphragm. The check member has a valve surface engageable with the inner edge of the diaphragm in order to prevent flow through the diaphragm opening from the inlet to the outlet. Stop means are provided to limit the movement of the check member between upstream and downstream positions. In the upsteam position, the valve surface on the check member engages the inner edge of the diaphragm when the diaphragm is in a relaxed position so that backflow is prevented. As the inlet is pressurized, the check member moves with the diaphragm to the downstream position of the check member in which the diaphragm engages the valve seat to close the vent passages and in which the valve surface remains in engagement with the inner edge of the diaphragm. The flexible resilient diaphragm then moves further downstream so that its inner edge moves away from the check member and flow through the central opening of the diaphragm is permitted.

The invention together with the above and other objects and advantages will be more fully understood from the following detailed description of illustrative embodiments of the invention illustrated in the accompanying drawings, wherein.

Figure 1:
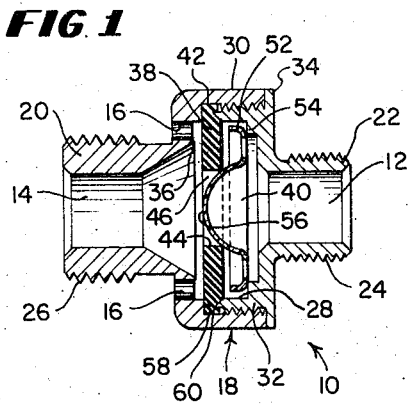
FIG. 1 is a sectional view of a backflow preventer in accordance with the present invention taken along its central longitudinal axis.
Figure 2:
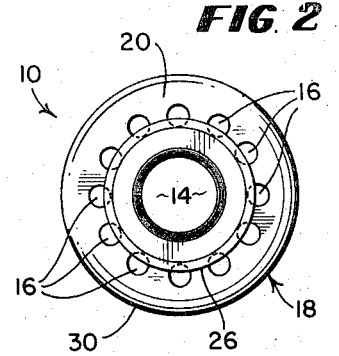
FIG. 2 is an end view of the backflow preventer taken from the left or outlet end as viewed in FIG. 1.
Figure 3:
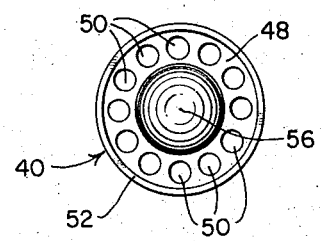
FIG. 3 is an elevational view of the check member of the backflow preventer of FIG. 1 also taken from the left as viewed in FIG. 1.

Having reference now to the drawings and initially to FIGS. 1-3, there is illustrated a backflow preventer constructed in accordance with the principles of the present invention and designated as a whole by the reference numeral 10. In general, the backflow preventer 10 includes an inlet 12 and outlet 14 for main flow through the preventer, together with vent or drain passages 16 for venting the outlet 14 when there is no flow through the inlet. In use, the inlet 12 is adapted to be connected to a fluid supply conduit, such as the outlet fitting of a water supply device such as a hydrant or sill cock. The outlet is adapted to supply fluid, for example, to a hose or other conduit.

In use, when the inlet 12 is pressurized, the vent passages 16 are closed and fluid flows through the outlet 14. When the inlet 12 is unpressurized, or when the outlet 14 is more highly pressurized than the inlet 12, the inlet and outlet do not communicate with one another and the outlet 14 is intercommunicated with the vent passages 16.

Proceeding now to a more detailed description of the backflow preventer 10, a housing generally designated as 18 includes a first, outlet member 20 and a second, inlet member 22. The inlet member 22 includes an externally threaded coupling portion 24 having an axially extending passageway forming the inlet 12. Portion 24 is adapted to be connected by threading to a water supply conduit such as the outlet of a hydrant or sill cock. Similarly, the outlet member 20 includes an externally threaded coupling portion 26 having an axial flow path comprising the outlet 14 and adapted to be connected to an outlet conduit such as, for example, a flexible hose.

A chamber 28 is defined within housing 18 by means of interconnected enlarged diameter skirt portions 30 and 32 of the outlet and inlet members 20 and 22, respectively. Although the housing portions may be interconnected in any desired manner, in the illustrated arrangement the skirt portion 30 includes internal threads engageable with external threads on the skirt portion 32. Portion 22 also includes a radially extending stop flange 34 against which skirt portion 30 abuts when the housing is fully assembled.

In order to provide for venting and drain of the outlet 14 when the inlet pressure does not exceed the outlet pressure, the housing 18 is provided with the vent passages 16. As appears in FIGS. 1 and 3, the vent passages 16 comprise a circular array of openings extending in an axial direction through the side wall of the skirt portion 30 of the outlet housing member 20. A circular valve seat 36 facing into the chamber 28 is disposed radially inside of the vent passages 16 and surrounding the outlet passage 14.

In accordance with an important feature of the present invention, the chamber 28 is provided with a resilient flexible diaphragm 38 together with a check member 40 disposed on the upstream or inlet side of the diaphragm 38. More specifically, the diaphragm 38 comprises a unitary body of flexible resilient material such as, for example, 35 durometer hardness silicone rubber or other elastomer. The diaphragm is annular in configuration and includes a circuit outer edge 42 as well as an inner circular wall or edge 44 defining a central axial opening 46 through the diaphragm 38 between the inlet 12 and the outlet 14. The diaphragm is peripherally fixed in the housing by clamping of its outer edge 42 between a clamp shoulder 58 and a clamp protuberance 60 formed respectively on outlet and inlet members 20 and 22.

Referring now to the check member 40, in the embodiment of the invention illustrated in FIGS. 1-5 this element comprises a stamped metal disc-like body having an annular planar portion 48 provided with a circular array of flow apertures 50. Radially outward of the apertures 50, the check member 40 includes a downstream - directed rib or skirt 52. In order to provide for limited axial movement of the check member 40, the height of the skirt 52 is somewhat less than the distance between the upstream side of the diaphragm 38 and a stop shoulder 54 formed within chamber 28 on the inlet housing member 22.

Radially inside of the circular array of flow apertures 50, the check member 40 is provided with a projection 56 extending in the downstream direction from the planar portion 48. In the illustrated embodiment, the projection 56 is in the form of a spherical segment and thus presents a smooth, rounded valving surface toward the inner edge 44 of the diaphragm 38.

In operation, when the inlet 12 and outlet 14 are at the same pressure, for example when the inlet is unpressurized and the outlet is unpressurized, the components of the backflow preventer 10 are disposed as illustrated in FIG. 1. In this condition, the diaphragm 38 assumes its relaxed condition and lies substantially in a flat plane dividing the inlet 12 from the outlet 14. The base of skirt 52 or planar portion 48 of the check member 40 abuts against the stop shoulder 54, and the dimensions of the check member 40 are such that in this condition the valve surface formed on projection 56 engages the inner edge 44 of diaphragm 38. Preferably, this is in the nature of a friction fit with the resilience of the diaphragm tending to hold the edge 44 in sealing relation with the projection 56.

Also in this unpressurized condition of the backflow preventer 10, the diaphragm 38 is spaced from the valve seat 36 to the end that the outlet passage 14 freely intercommunicates over the valve seat 36 with the vent passages 16. Consequently, the outlet 14 and any hose or other conduit communicating with the outlet are vented and/or drained.

When the inlet 12 is pressurized, as by opening of a water supply valve upstream from the backflow preventer 10, pressure is applied to the upstream side of the check member 40 causing both the check member 40 and the diaphragm 38 to move in a downstream direction, —i.e. to the left as viewed in FIG. 1. Having reference now to FIG. 4, this downstream movement continues until the diaphragm 38 sealingly engages the valve seat 36. At this point, the outlet passage 14 is isolated from the vent passages 16 so that the vent passages do not communicate with either the outlet 14 or the inlet 12.

Figure 4:
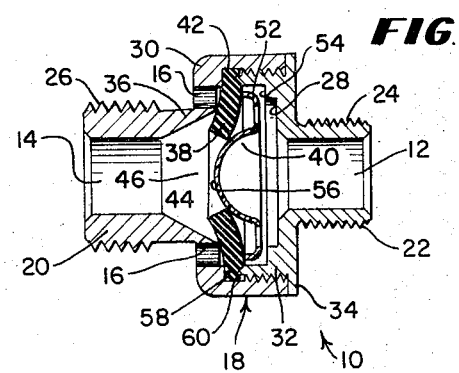
FIGS. 4 and 5 are views similar to FIG. 1 showing the backflow preventer respectively in an intermediate position and in the full open position following pressurization of the inlet.
Figure 5:
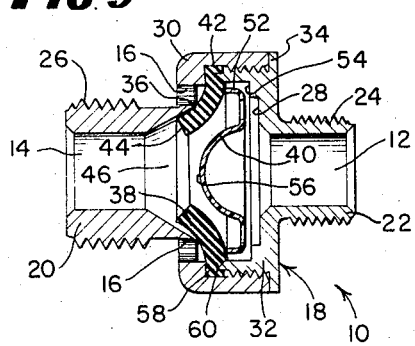

Due to the limited freedom of movement of the check member 40, the check member 40 moves together with the diaphragm 38 for a portion of its downstream movement. As illustrated in FIG. 4, when the valve seat 36 is closed by the diaphragm 38, the downstream edge of the skirt 52 of the member 40 abuts against the diaphragm 38 adjacent its fixed outer edge to prevent further movement of the check member 40 in the downstream direction. At this intermediate position illustrated in FIG. 4, not only are the vent passages 16 closed, but also the projection 56 continues to engage the inner edge 44 and prevent any flow through the opening 46 of the diaphragm 38.

After the check member 40 is prevented from further downstream movement by engagement of skirt 52 with the diaphragm 38, pressure is also applied through the flow apertures 50 of member 40 to the diaphragm 38. Since the inner edge 44 of the diaphragm is radially well inside of the valve seat 36, the central portion of the diaphragm inside the valve seat 36 is able to further flex in the downstream direction. Thus, the inner edge 44 moves away from the projection 56 and flow from the inlet 12 to the outlet 14 is permitted. More specifically, pressurized fluid entering the inlet 12 flows through the apertures 50, between the projection 56 and the diaphragm 38, through the central opening 46 of the diaphragm and through the outlet 14.

It may occur at some point in use of the backflow preventer 10 that the outlet 14 becomes pressurized to a greater extent than the inlet 12. For example, if the outlet 14 is connected to a hose, the hose might be elevated. Similarly, the hose might be connected to a piece of equipment or the like and inadvertently subjected to excessive pressure. In this instance, the vent passages 16 are opened to the outlet 14 and backflow into the inlet 12 is positively prevented. More specifically, when the outlet pressure is equal to or in excess of the inlet pressure, the diaphragm 38 returns of its own natural resiliency, and/or due to the reverse applied pressure, to its relaxed condition shown in FIG. 1. At the same time, the check member 40 returns in the upstream direction until it is abutting the stop shoulder 54. If a reverse pressure is applied across the diaphragm 38 and member 40, the pressure will have the effect of even more tightly sealing the inner edge 44 against the projection 56. When the diaphragm 38 moves in the upstream direction away from the valve seat 36, the outlet 14 in itercommunicated with the vent passages 16 so that the outlet 14 is permitted to drain either outwardly through the outlet 14, or in the event that the outlet is connected to an elevated hose or the like, through the vent passages 16.

The backflow preventer 10 of the present invention has several important advantages both from the standpoint of fabrication and assembly, as well as in function. Due to the rounded nature of the projection 56 and the smoothly contoured surface assumed by diaphragm 38 in the open position illustrated in FIG. 5, flow through the preventer 10 takes place with little flow restriction or turbulence. Consequently, the difficulties of pressure drop, noisy operation, and the possibility of fouling and malfunction encountered with prior art devices where flow takes place through coil springs or the like is avoided. In addition, the backflow preventer 10 provides a very simple arrangement since no separate spring or the like is required for operation of the check member 40. Fabrication of the device is easy because both the diaphragm 38 and check member 40 are simple in configuration.

Figure 6:
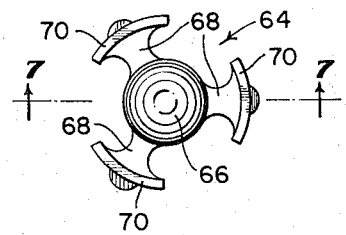
FIG. 6 is an elevational view, from the downstream side, of an alternative check member for use with the backflow preventer of FIG. 1.
Figure 7:
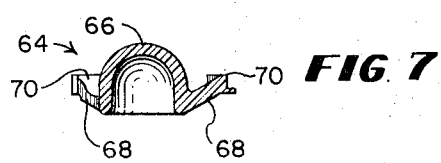
FIG. 7 is a sectional view of the check member of FIG. 6 taken along the line 7—7 of FIG. 6.

With reference now to FIGS. 6 and 7, there is illustrated another form of check member, generally designated by the reference numeral 64, which may be used in place of the check member 40 with the backflow preventer 10. The check member 64 includes a projection portion 66 similar in configuration to the projection 56 of the check member 40. Extending radially outward from the projection 66 are arms 68 terminating in rim or skirt portions 70 functioning in a manner similar to the skirt 52 of the check member 40. Flow through the check member 66 takes place between the arms 68. If desired, the check member 64 may be formed by molding from a suitable plastic material or the like.

Although the invention has been described with reference to details of the illustrated embodiment, such details are not intended to limit the scope of the invention which is defined in the following claims.

What is claimed and desired to be secured by Letters Patent of the United States is:

1. A backflow preventer comprising:
   a housing having an inlet passage and an outlet passage;
   a generally annular diaphragm having an outer peripheral region fixed to said housing between the inlet and outlet passages and having a central opening bounded by an inner region; said diaphragm being flexible and resilient for movement downstream from a relaxed position in response to pressurization of the inlet passage;
   a valve seat surrounding the outlet passage radially between the diaphragm outer and inner regions and spaced downstream from the diaphragm in its relaxed position;
   a vent passage radially outside said valve seat and communicating across said valve seat with said outlet passage in the relaxed position of said diaphragm;
   a check member disposed on the upstream side of said diaphragm and having a valve surface engageable with said inner region; and
   spaced stop means for permitting limited movement of said check member between an upstream position wherein the valve surface engages said inner region in the relaxed position of the diaphragm and a downstream position wherein said diaphragm engages said valve seat and said valve surface remains in engagement with said inner region;
   the portion of said diaphragm radially inside said valve seat being movable further downstream to permit flow through said central opening.

2. The backflow preventer of claim 1, said inner region including a circular inner edge wall of said diaphragm, and said valve surface being defined on a projecting portion of said check member.

3. The backflow preventer of claim 2, said projecting portion comprising a spherical segment.

4. The backflow preventer of claim 2, said check member including flow passage means radially outside of said valve surface.

5. The backflow preventer of claim 4, said check member including peripheral skirt means confined for limited movement between said stop means.

6. The backflow preventer of claim 5, said stop means including an upstream stop surface formed on said housing, and a downstream stop surface formed on the upstream side of said diaphragm adjacent said outer region.

7. The backflow preventer of claim 5, said skirt means being continuous and said flow passage means comprising a circular array of openings.

8. The backflow preventer of claim 5, said skirt means including discrete segments, arms joining said segments to said valve surface, and said flow passage means including openings between said arms.

9. The backflow preventer of claim 1, said housing including inlet and outlet members attached to one another, said diaphragm being peripherally clamped between said members.

10. A backflow preventer comprising in combination:

a body defining an upstream liquid flow passage and a downstream liquid flow passage;

a valve seat surrounding said downstream passage;

a flexible resilient member separating said upstream passage from said valve seat and downstream passage;

vent passage means in said body disposed radially outside of said valve seat on the downstream side of said resilient member;

said resilient member including a periphery fixed to said body, a sealing surface radially inside said periphery adapted to engage said valve seat to close said vent passage means upon downstream deflection of said resilient member, and a central aperture through said resilient member radially inside of said sealing surface;

and the improvement comprising:

a check valve member mounted in said upstream passage for movement together with said flexible member in a limited range of movement between an upstream position and a downstream position in which said flexible member engages said valve seat, and a valve surface on said check valve member engageable with the upstream side of said flexible member to close said central aperture throughout said range of movement, said flexible member being movable downstream beyond said downstream position of said check valve member to open said central aperture for flow between said upstream and downstream passages.

* * * * *